(12) United States Patent
Spencer

(10) Patent No.: US 10,821,814 B2
(45) Date of Patent: Nov. 3, 2020

(54) MOLDED SURFACE FASTENER

(71) Applicant: Truxedo, Inc., Ann Arbor, MI (US)

(72) Inventor: Michael R. Spencer, Hubbard, NE (US)

(73) Assignee: TRUXEDO, INC., Ann Arbor, MI (US)

( * ) Notice: Subject to any disclaimer, the term of this patent is extended or adjusted under 35 U.S.C. 154(b) by 3 days.

(21) Appl. No.: 16/242,362

(22) Filed: Jan. 8, 2019

(65) Prior Publication Data
US 2020/0215887 A1   Jul. 9, 2020

(51) Int. Cl.
*B60J 7/10* (2006.01)
*A44B 18/00* (2006.01)
*B29L 31/00* (2006.01)

(52) U.S. Cl.
CPC .......... *B60J 7/104* (2013.01); *A44B 18/0015* (2013.01); *A44B 18/0049* (2013.01); *A44B 18/0061* (2013.01); *B29L 2031/729* (2013.01)

(58) Field of Classification Search
CPC ................. B60J 7/104; Y10C 24/2792; F16B 2001/0028
USPC ............ 296/100.16, 100.06, 100.17; 24/452
See application file for complete search history.

(56) References Cited

U.S. PATENT DOCUMENTS

| | | | |
|---|---|---|---|
| 6,544,245 B2 | 4/2003 | Neeb et al. | |
| 7,172,008 B2 | 2/2007 | Vanbenschoten et al. | |
| 7,604,282 B2 | 10/2009 | Spencer et al. | |
| 7,815,239 B1 | 10/2010 | Schmeichel et al. | |
| 8,167,353 B2 | 5/2012 | Schmeichel et al. | |
| 8,523,266 B2 | 9/2013 | Yue | |
| 8,756,770 B2* | 6/2014 | Cina | A44B 18/0049 24/452 |
| 8,857,887 B1 | 10/2014 | Schmeichel | |
| 9,924,765 B1* | 3/2018 | Coronel | A44B 18/0069 |

OTHER PUBLICATIONS

TruXedo Titanium Hard Rolling Tonneau Features and Benefits, published on Jul. 17, 2015 at https://www.youtube.com/watch?v=tzwMYRXiG_4 (last accessed Jan. 4, 2019).
TruXedo TruXport Roll-Up Truck Bed Cover Features and Benefits, published on Jun. 6, 2017 at https://www.youtube.com/watch?v=qei5zx06TmM (last accessed Jan. 4, 2019).

* cited by examiner

*Primary Examiner* — Dennis H Pedder
(74) *Attorney, Agent, or Firm* — The Dobrusin Law Firm, P.C.; Bryan S. Lemanski

(57) ABSTRACT

A vehicle cover assembly comprising; a flexible cover; one or more side rails; and a fastener assembly that is secured to a vehicle bed comprising; a cover fastener that is on one or more edge regions of the flexible cover; and a side rail fastener with one or more rows of fasteners comprising; a plurality of dual hooks on the base that releasably connect with the cover fastener of the flexible cover; and a plurality of spacers between the plurality of dual hooks.

19 Claims, 6 Drawing Sheets

MOLDED SURFACE FASTENER

FIELD

The present teachings relate to hook and loop fasteners, and specifically, the hook and loop fasteners relate to a fastening means for vehicle bed covers.

BACKGROUND

Flexible vehicle bed covers generally are rolled across the vehicle bed and engaged by hoop and loop fasteners for quick and efficient covering of the contents of the vehicle bed. Many flexible covers that use hook and loop fasteners tend to engage before the user has had a chance to evenly distribute the cover over the vehicle bed. When the flexible cover is unevenly distributed on the vehicle bed, it is difficult to protect the contents of the vehicle from inclement weather and theft, and untightened portions of the cover may collect fluid, which may eventually ingress into the vehicle bed. Furthermore, every readjustment of the flexible cover causes the hook and loop fasteners to degrade faster, which then requires replacement.

Examples of some hook and loop fasteners can be found in U.S. Pat. Nos. 8,523,266; 8,167,353; 7,815,239; and 6,544,245 and YouTube videos TruXedo Titanium Hard Rolling Tonneau Features and Benefits, published on Jul. 17, 2015 and TruXedo TruXport Roll-Up Truck Bed Cover Features and Benefits, published on Jun. 6, 2017 all of which are incorporated by reference herein for all purposes. What is needed is a flexible cover that will not pre-engage when the user rolls the flexible cover over the vehicle bed. What is needed is a flexible cover that will rest on sides of the vehicle bed before the user is ready to engage the flexible cover. What is needed is a flexible cover that requires an extra step or user engagement to engage the flexible cover.

SUMMARY

The present teachings meet one or more present needs by providing: a vehicle cover assembly comprising; a flexible cover; one or more side rails; and a fastener assembly that is secured to a vehicle bed comprising; a cover fastener that is on one or more edge regions of the flexible cover; and a side rail fastener with one or more rows of fasteners comprising; a plurality of dual hooks on the base that releasably connect with the cover fastener of the flexible cover; and a plurality of spacers between the plurality of dual hooks.

A vehicle cover assembly comprising; a flexible cover; one or more side rails; and a fastener assembly that is secured to a vehicle bed comprising; a cover fastener that is on one or more edge regions of the flexible cover; and a side rail fastener with one or more rows of fasteners comprising; a plurality of dual hooks each including a top edge, the plurality of dual hooks being located on base that releasably connect with the cover fastener of the flexible cover; and a plurality of spacers having an upper surface, the plurality of spacers being located between the plurality of dual hooks along a length of the fastener assembly; wherein the upper surface of the plurality of spacers is elevated above the top edge of the plurality of dual hooks so that when the flexible cover extends over the fastener assembly, the flexible cover contacts the upper surface of the plurality of spacers and substantially prevents pre-engagement of the plurality of dual hooks and the cover fastener.

The present teachings provide a hook and loop fastener that prevents pre-engagement of the flexible cover as the flexible cover is rolled onto the vehicle bed. The present teachings provide a hook and loop fastener that allows the flexible cover to rest on top of the vehicle bed and protect the contents of the vehicle bed from water damage by providing a seal around the vehicle bed. The present teachings provide a hook and loop fastener that supports the flexible cover such that a force needs to be applied to engage the flexible cover.

DETAILED DESCRIPTION OF DRAWINGS

Figure 1:
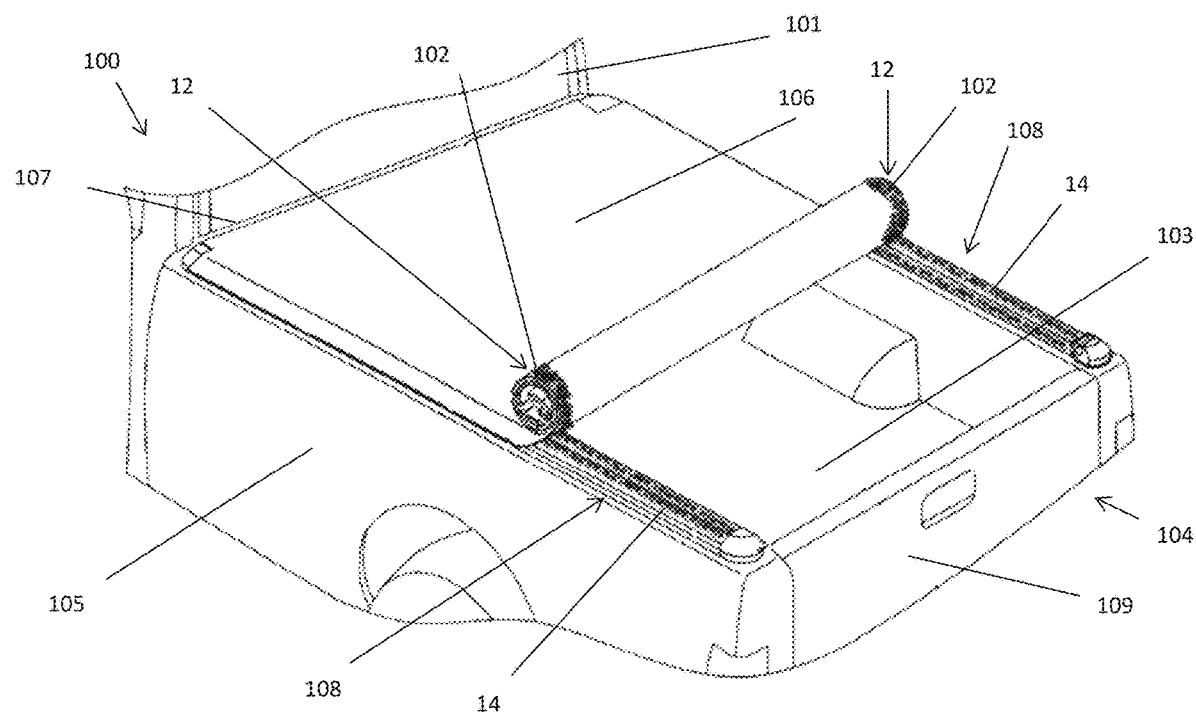
FIG. 1 is a perspective view of a vehicle cover assembly.

The vehicle cover assembly may function to protect the contents of the vehicle bed from inclement weather, theft, damage, fluid, dirt, or a combination thereof. The vehicle cover assembly may be located at the rear of the vehicle. The vehicle cover assembly may be used for a gator, dune buggy, golf cart, truck, car, off-road vehicle, or any vehicle that may have a vehicle bed. The vehicle cover assembly may cover an entire vehicle bed with a flexible cover.

The vehicle bed may function to store items. The vehicle bed may include a cab wall, vertical walls, a tailgate, or a combination thereof. The vehicle bed may include one or more vertical walls, two or more vertical walls, three or more vertical walls, four or more vertical walls, or a combination thereof. The vertical walls may be perpendicular the cab wall, the tailgate, or both. The two or more vertical walls may be parallel to each other. The vehicle bed may have a smooth surface. The vehicle bed may have a rough surface. The vehicle bed may contact the side rails. The side rails and the vertical walls may form a connection. The side rails may rest on top of the vertical walls. The side rail and the vertical wall may connect on an inner portion of the vertical wall so that the side rail is substantially inside of the vehicle bed (e.g. inside of the vehicle bed but not completely above the vertical walls). The side rails may extend away from the bed. The vertical walls, cab wall, and tailgate may create a periphery around the bed. The side rails may extend upwards from the bed so that the bed has a volume that may receive items within the bed. The vehicle bed may extend from the cab of the vehicle to a rear region of the vehicle. The lowest portion of the vehicle bed may be the vehicle floor (e.g., bed floor).

The vehicle floor (e.g., bed floor) may function as the bottom surface of the vehicle bed. The vehicle floor may be rigid. The vehicle floor may be smooth. The vehicle floor may have a plurality of ridges, ribs, studs, hooks, or a combination thereof. The vehicle floor may contact vertical walls, a cab wall, a tailgate, or a combination thereof that each extends vertically so that a container is formed. The vehicle floor may have a fluid seal when in contact with the vertical walls, cab wall, tailgate, or a combination thereof.

The vehicle floor and the flexible cover may be parallel relative to a horizontal plane. The vehicle floor may be a distance below the flexible cover. The distance may be 65 cm or less, 60 cm or less, or 55 cm or less. The distance may be 40 cm or more, 45 cm or more, or 50 cm or more. The vehicle floor may contact one or more vertical walls.

The vertical walls may function to support the side rails, flexible cover, or both over the vehicle bed. The vertical walls, cab wall, tailgate, or a combination thereof may be form a container or fluid seal. The vertical walls, vehicle floor, tailgate or both may connect at substantially 90 degree angles (e.g ±1 degree or more, ±3 degrees or more, ±5 degrees or more, ±7 degrees or more, ±9 degrees or more). The vertical walls and the side rails may form a connection by clamps, fasteners, hooks, holes, clips, or a combination thereof.

The cab wall may function to connect the vehicle bed and the vehicle cab. The cab wall and the tailgate may be parallel. The cab wall and the tailgate may be substantially the same width. The cab wall may hold the flexible cover in a rolled or stored position. The cab wall and the flexible cover may be attached. The cab wall and the side rails may connect. The cab wall and the flexible cover may not be attached. The cab wall may contact the vehicle floor or vertical wall at a substantially 90 degree angle (e.g ±1 degree or more, ±3 degrees or more, ±5 degrees or more, ±7 degrees or more, ±9 degrees or more).

The tailgate may function to open the vehicle bed. The tailgate may realeasably connect to the one or more vertical walls. The tailgate may releasably connect to the one or more side rails. The tailgate may releaseably connect with the vehicle floor. The tailgate and the flexible cover may be connected. The tailgate and the flexible cover may form a fluid seal. The tailgate may contact a side rail. The tailgate and side rail may form a connection. The cab wall may contact the vehicle floor or vertical wall at a substantially 90 degree angle (e.g ±1 degree or more, ±3 degrees or more, ±5 degrees or more, ±7 degrees or more, ±9 degrees or more).

The flexible cover may function to cover the entire vehicle bed, cover a volume over the vehicle bed, or both. The flexible cover may be or include vinyl, fabric, a water resistant material, a polymer, metal, a reinforcing material, aramid fiber, a rubber, an elastomer, or a combination thereof. The flexible cover may be stored in a container that is near the cab of the vehicle when the flexible cover is unengaged. An upper surface of the flexible cover may include a coating. An upper surface of the flexible cover may be sealed with a coating (e.g., a coating that is water resistant, water proof, UV protection). A lower surface of the flexible covering may include a portion of a fastener (e.g., a hook and loop fastener (i.e., the hooks or preferably the loops)). The portion of the fastener on the flexible cover may not engage until a force is applied to the flexible cover while the flexible cover rests on the portion of the fastener connected to the side rails. The fasteners on the flexible cover may not fully engage until a force is applied to the fasteners on both sides of the flexible cover (e.g., opposing edges of the flexible cover on a same surface (e.g., bottom surface)). The flexible cover may be engaged when fully extended over the vehicle bed. The flexible cover may be unengaged when fully extended over the vehicle bed. The flexible cover may be unengaged when rolled up against the cab of the vehicle. The flexible cover may be partially unengaged and partially engaged when rolled up partially along the side rails. Preferably, the flexible cover may be unengaged when partially or fully rolled along the side rails until an attachment step is performed where the two opposing portions of the fasteners are connected. The flexible cover may include strips of fasteners on either lateral side of the flexible cover. Each lateral side of the flexible cover may include at least one strip of loop fasteners. Preferably, the flexible cover may include at least two strips of loop fasteners on each of the lateral sides of the flexible covering. The flexible cover may include one or more strips of fasteners or two or more strips of fasteners along a forward edge region, a rear edge region, a first lateral edge region, a second lateral edge region, or a combination thereof.

The fastener assembly may function to connect a flexible cover over the vehicle bed. The fastener assembly may include two or more portions. The fastener assembly may include one or more cover fasteners and one or more side rail fasteners. The fastener assembly may connect a cover to a vehicle so that during vehicle movement the cover is prevented from moving from the bed. The one or more cover fasteners when connected to the one or more side rail fasteners form a connection with the flexible cover and the side rails that are connected with the walls of the bed (e.g., vertical walls, cab wall, tailgate).

The cover fasteners may function to releasably connect the flexible cover and the side rail side rail fastener. The cover fasteners may include one or more strips of loop fasteners, a base, or both. The cover fasteners may include one or more strips of loop fasteners, two or more strips of loop fasteners, three or more strips of loop fasteners, or four or more strips of loop fasteners. The cover fastener may include a base that attaches with the flexible cover. The strips of loop fasteners may be attached with the base of the cover fastener. Each strip of loop fasteners may be attached with a separate base of the cover fastener. The cover fasteners may be attached to the flexible cover by a mechanical fastener, a chemical fastener, or both. The mechanical fastener may be sewing, stapling, wire, melting, heat staking, ultrasonic welding, or a combination thereof. The chemical fastener may be an adhesive, a single part epoxy, a two-part epoxy, a peel and stick tape, or a combination thereof. The cover fasteners may be opposite of side rail fasteners, and the side rail fasteners may include hooks for engagement with the loop fasteners of the cover fastener. The cover fasteners and the side rail fasteners may connect at the dual hooks, opposing duals hooks, or both. Specifically, the loop fasteners may connect at the front hook, rear hook, or both as described herein. The cover fasteners may include dual hooks, opposing dual hooks, loop fasteners, or a combination thereof. The strip of loop fastener may not engage with the side rail fasteners without a force being applied to the flexible cover. The strip of loop fasteners may engage when a force is applied to the flexible cover.

The strips of loop fasteners may function to connect the cover over the bed. The strip of loop fasteners may attach to a base of the cover fastener by a mechanical fastener, a chemical fastener, or both. The mechanical fastener may be sewing, stapling, wire, melting, heat staking, ultrasonic welding, or a combination thereof. The chemical fastener may be an adhesive, a single part epoxy, a two-part epoxy, a peel and stick tape, or a combination thereof. The strip of loop fasteners may rest on the spacers. The strip of loop fasteners may rest on the external flange, internal flange, or both. The strip of loop fasteners may engage with the connection lip of the front hook, rear hook, or both of the dual hooks, opposing dual hooks, or both. The strip of loop fasteners may be substantially the same width as base of the side rail fastener (e.g., ±0.1 cm, ±0.5 cm, or ±1 cm). The strip of loop fasteners completely covers the side rails. The strip of loop fasteners may cover a portion of the side rails.

The ratio of strips of loop fasteners and the side rail fasteners may be 1:1. The strip of loop fasteners may rest on the side rails.

The side rails may function to support the flexible cover. There may be one or more, two or more, three or more, or four or more side rails. The side rails may function to support the flexible cover over the vehicle bed. The side rails may contact the vertical walls. The vertical walls and the side rails may be connected by clamps, screws, bolts, slam latches, or a combination thereof. The side rails may include an extension plate that rests on the vertical walls. The side rails may not include an extension plate. The side rails may include a connecting portion and a longitudinal portion that supports the flexible cover. The side rails may be connected to a vertical wall of the vehicle bed. The side rails may include a connection feature that assists the connection between the side rails and the vehicle bed. The side rails may be angled to prevent pre-engagement of the fastener assembly. Specifically, the side rails may include an external flange, an internal flange, fastener supports, or a combination thereof. The internal flange may be elevated above the external flange when the vehicle bed and the side rail are connected. The fastener support may slope down at an angle from the internal flange and the external flange. The angle of the fastener support, relative to the clamp plate, the connecting portion, or both, may be 90 degrees or more, 100 degrees or more, 110 degrees or more, 120 degrees or more, 125 degrees or more, or 130 degrees or more. The angle of the fastener support may be 150 degrees or less, 145 degrees or less, 140 degrees or less, or 135 degrees or less. The side rail fasteners may contact the side rails at the fastener support between the external flange and the internal flange. The side rail may contact the vehicle bed at the clamp plate.

The clamp plate may function to connect the vehicle bed and the side rails. The clamp plate may include a plurality of ribs that function to secure an attachment piece to the clamp plate. The attachment piece may be a bolt, a screw, a clamp, a slam latch, or any similar clamping means. The clamp plate and the connecting portion may be parallel. The clamp plate and the lateral wall of the vehicle bed may be parallel. The clamp plate may connect to the extension plate at a perpendicular angle.

The plurality of ribs may function to secure an attachment piece and the clamp plate so that the side rails and the vertical walls connect. The plurality of ribs may substantially grip a clamp so that the clamp stays secure during vehicle movement (e.g., the clamp will be not slide off of the clamp plate while engaged). The clamp plate may include a plurality of ribs that may be 1, or more 2 or more, 3 or more, 4 or more, 5 or more, 6 or more, or 7 or more ribs. The ribs may be rounded, curved, pointed, triangular, square or a combination thereof. The clamp plate may contact and support the extension plate.

The extension plate may function to support the side rail on the vehicle bed. The extension plate may extend away from the clamp plate toward the lateral edge of the vertical walls. The extension plate may support the weight of the flexible cover. The extension plate may be above a top surface of the vehicle bed. The extension plate may be below a top surface of the vehicle bed. The extension plate may assist in creating a water seal between the vertical walls of the truck bed and the side rails. The extension plate may extend away from the flexible cover. The side rail includes a connecting portion that may help to support the flexible cover.

The connecting portion may function to connect the longitudinal piece and the fastener support. The connecting portion may contact the fastener support at an angle. The angle may be 90 degrees of more, 95 degrees or more, 100 degrees or more, 105 degrees or more, 110 degrees or more, or 115 degrees or more. The angle may be 145 degrees or less, 140 degrees or less, 135 degrees or less, 130 degrees or less, 125 degrees or less, or 120 degrees. The connecting portion may contact the longitudinal piece at a substantially right angle so that the flexible cover may evenly rest on the longitudinal piece (i.e., 90 degrees and ±5 degrees). The connecting portion may include a ridge that is level with the hook such that an object may be slid and supported between the hook and the ridge. The connecting portion may extend below the lowest point of the clamp plate. The connecting portion may extend to above the lowest point of the clamp plate. The connecting portion may be adjacent to the longitudinal portion.

The longitudinal portion may function to support the flexible cover. The longitudinal portion may be substantially planar such that the flexible cover may lay flat on the side rails. The longitudinal portion may be substantially level, substantially parallel to the bed, or both. The longitudinal portion may contact the connecting portion. The longitudinal portion may be substantially planar along the length of the longitudinal portion. The longitudinal portion may include one or more depressions that may extend the length of the side rail. The longitudinal portion may include one or more apertures for connecting the side rail and the vehicle bed. The longitudinal portion may include one or more apertures for connecting the side rail and the flexible cover. The longitudinal portion may connect to and extend from the connecting portion. The longitudinal portion may extend cantilever from the connecting portion. The connecting portion may include a hook.

The hook may be an extension of the fastener support. The hook may have an L-shape, C-shape, or V-shape. The hook may be a support member for an object. The hook may extend from a rear surface of the fastener support. The hook may extend towards the bed of the vehicle. The hook may be level with the ridge of the connecting portion.

The ridge may be an extension of the connecting portion. The ridge may extend towards the clamp plate. The ridge may extend towards the clamp plate at an angle of 90 degrees or less, 85 degrees or less, 80 degrees or less, 75 degrees or less, or 70 degrees or less. The ridge may be level with the hook such that an object may be slide between the ridge and the hook. An object may rest on the ridge and the hook and supported by the ridge and the hook.

The external flange may function to assist in preventing pre-engagement of the fastener assembly. The external flange may prevent pre-engagement of a portion of the cover fasteners (e.g., an external edge of a strip of the cover fasteners with an internal edge of the strip of bed fasteners). The external flange may be located on an opposite side of the fastener support than the internal flange. The external flange may be proximate to the vertical wall of the vehicle bed, the extension plate, the clamp plate, or a combination thereof. The external flange may be lowered below the internal flange by 0.1 cm or more. 0.3 cm or more, 0.5 cm or more, 0.7 cm or more, or 0.9 cm or more. The external flange may be lowered below the internal flange by 1 cm or more, 2 cm or more, or 3 cm or more. The external flange may be lowered below the internal flange by 15 cm or less, 10 cm or less, or 5 cm or less. The external flange may be the lowest point of the sloped fastener support as described herein. A distal portion of the external flange may contact a spacer, dual hook, opposing dual hook, or a combination thereof. The external flange may be located in an edge region of the fastener support or may extend to the external edge of the fastener assembly. The external flange may be substantially L-shape, C-shape, or V-shape so that the external flange may hang over the base of the side rail fasteners. The external flange may partially cover the side rail fasteners such that the external flange substantially prevents pre-engagement of the fastener assembly (e.g., the strips of loop fasteners will not engage with the dual hooks, opposing dual hooks, or both without a force being applied). The external flange may function to support the flexible cover on the side rails. The external flange may substantially prevent pre-engagement of the fastener assembly by providing a physical buffer so that a force on the flexible cover is required to engage the fastener assembly. The external flange and the internal flange may in combination substantially prevent pre-engagement of the fastener assembly. The external flange and the internal flange may function together to prevent pre-engagement of the flexible cover.

The internal flange may function to prevent pre-engagement of the fastener assembly. Preferably, the external flange may prevent pre-engagement of a portion of the cover fastener (e.g., an internal edge of a strip of the cover fasteners with the internal edge of the strip of bed fasteners). The internal flange may be proximate to the longitudinal piece, connecting portion, or both. The internal flange may contact a portion of the lower surface of the flexible cover that does not include fasteners. The internal flange may be elevated above the external flange by 0.1 cm or more. 0.3 cm or more, 0.5 cm or more, 0.7 cm or more, or 0.9 cm or more. The internal flange may be elevated above external flange by 1 cm or more, 2 cm or more, or 3 cm or more. The internal flange may be elevated above the external flange by 15 cm or less, 10 cm or less, or 5 cm or less. The internal flange may be the highest point of the sloped fastener support as described herein. The internal flange may be the highest point of the side rails such that the internal flange is the first point of contact when the flexible cover is engaged, partially engaged, unengaged, or a combination thereof. A distal portion of the internal flange may contact a spacer, dual hook, opposing dual hook, or a combination thereof. The internal flange may be located at the inner edge region of the fastener support. The internal flange may extend over the external edge of the fastener assembly. The internal flange may be substantially L-shape, C-shape, or V-shape so that the internal flange may hang over the base of the side rail fasteners. The internal flange may partially cover the side rail fasteners such that the internal flange prevents pre-engagement of the fastener assembly. The internal flange may contact the internal edge of the fastener assembly. The internal flange may partially cover the side rail fasteners such that the internal flange prevents pre-engagement of the fastener assembly. The internal flange may function to support the flexible cover on the side rails. The internal flange may define the inner most portion of the fastener support (e.g., the closest portion to the center of the vehicle bed).

The fastener support may function to support the side rail fasteners on the side rails. The fastener support may be substantially planar (e.g., within about ±5 percent or less, preferably ±3 percent or less, or more preferably ±1 percent or less angle from the plane). Preferably, the fastener support may be elevated above the vertical walls of the vehicle bed. The fastener support may be slanted. The fastener support may extend at an angle relative to the internal flange, the external flange, or both. The angle may be about 90 degrees or more, about 95 degrees or more, about 100 degrees or more, or about 102 degrees or more (i.e., about 105 degrees) relative to the internal flange, the external flange, or both. The angle may be about 135 degrees or less, about 125 degrees or less, or about 115 degrees or less relative to the internal flange, the external flange, or both. The fastener support may have a downward slope relative defined by the internal flange down to the external flange. The fastener support and the side rail fasteners may be connected by a mechanical fastener, a chemical fastener, or both as are discussed herein. The fastener support may include a hook that is level with the ridge. The fastener support may be contacting the side rail fasteners such that the fastener support and side rail fasteners are substantially flat.

The side rail fasteners may function to assist in connecting the flexible cover and the side rails. The side rail fasteners may include a base and a plurality of rows of fasteners. The side rail fasteners may cover the fastener support across the length of the side rail. The side rail fasteners may cover a portion of the fastener support across the length of the side rail. The side rail fasteners may cover an end portion of the fastener support across the length of the side rail. The side rail fasteners may contact the external flange, the internal flange, or both. The side rail fasteners may be substantially as wide as the fastener support. The side rail fasteners may be partially covered by the external flange, the internal flange or both such that the external flange, the internal flange, or both work with the plurality of spacer to prevent pre-engagement of the strip of loop fasteners. The side rail fasteners may include rows of fasteners. The side rail fasteners may include one or more rows of fasteners; two or more rows of fasteners; three of more rows of fasteners; four or more rows of fasteners; five or more rows of fasteners; six or more rows of fasteners; seven or more rows of fasteners; or a plurality of rows of fasteners. The cover fasteners, the side rail fasteners, or both may have a hook density of about 30 hooks or more per $cm^2$, about 40 hooks or more per $cm^2$, about 50 hooks or more per $cm^2$, about 100 hooks or more per $cm^2$, about 150 hooks or more per $cm^2$, about 200 hooks or more per $cm^2$, or about 250 hooks or more per $cm^2$. The cover fasteners, the side rail fasteners, or both may have about 1000 hooks or less per $cm^2$, about 750 hooks or less per $cm^2$, about 600 hooks or less per $cm^2$, about 500 hooks or less per $cm^2$, or about 400 hooks or less per $cm^2$. The cover fasteners, side rail fasteners, or both may have a hook density from about 39 hooks to about 620 hooks per $cm^2$. The side rail fasteners, cover fasteners, or both may have a spacer density of 30 spacers or more per $cm^2$, about 40 spacers or more per $cm^2$, about 50 spacers or more per $cm^2$, about 100 spacers or more per $cm^2$, about 150 spacers or more per $cm^2$, about 200 spacers or more per $cm^2$, or about 250 spacers or more per $cm^2$. The cover fasteners, the side rail fasteners, or both may have about 1000 spacers or less per $cm^2$, about 750 spacers or less per $cm^2$, about 600 spacers or less per $cm^2$, about 500 spacers or less per $cm^2$, or about 400 spacers or less per $cm^2$. Each row of fasteners may be separated by a distance. The distance may be 0.1 µm or more, 0.2 µm or more, 0.3 µm or more, 0.4 µm or more, or 0.5 µm or more. The distance D1 may be 1.0 µm or more, 1.5 µm or more, 2.0 µm or more, 2.5 µm or more, or 3.0 µm or more. The distance may be 10 µm or more, 15 µm or more, 20 µm or more, 25 µm or more, of 30 µm or more. The distance may be 100 µm or more, 150 µm or more, 200 µm or more, 250 µm or more, of 300 µm or more. The distance may be 1000 µm or less, 800 µm or less, 600 µm or less, or 400 µm or less. The rows of fasteners in the side rail fasteners may include dual hooks, opposing dual hooks, spacers, or a combination thereof. The height of the spacers may be substantially the same throughout the plurality of rows of fasteners. The height of the dual hooks, the opposing dual hooks, or both may be substantially the same throughout the plurality of rows of fasteners. The height of the spacers may be elevated above the dual hooks, opposing dual hooks, or both by a distance. The distance may be 0.1 µm or more, 0.2 µm or more, 0.3 µm or more, 0.4 µm or more, or 0.5 µm or more. The distance may be 1.0 µm or more, 1.5 µm or more, 2.0 µm or more, 2.5 µm or more, or 3.0 µm or more. The distance may be 10 µm or more 15 µm or more, 20 µm or more, 25 µm or more, or 30 µm or more. The distance may be 100 µm or more, 150 µm or more, 200 µm or more, 250 µm or more, or 300 µm or more. The distance may be 100 µm or more, 150 µm or more, 200 µm or more, 250 µm or more, of 300 µm or more. The distance may be 1000 µm or less, 800 µm or less, 600 µm or less, or 400 µm or less. The external flange, internal flange, and plurality of spacers may be elevated to a sufficiently tall height such that the flexible cover may rest on the side rails without engaging the strip of loop fasteners. The external flange, internal flange, plurality of spacers, or a combination thereof may be elevated by a distance to substantially prevent pre-engagement of the fastener assembly (e.g., the fastener assembly may not engage until a force is applied). The side rail fasteners may include a base that contacts the fastener support.

The base of the side rail fasteners may function to contact the fastener support. The base may have a thickness from about 0.00025 mm to about 5.0 mm or more. The base may be connected with the plurality of spacers, plurality of opposing dual hooks, the plurality of dual hooks, or a combination thereof. The base may function to support the plurality of spacers, plurality of opposing dual hooks, the plurality of dual hooks, or a combination thereof in a vertical position. The base may be vinyl, fabric, rubber, cloth, or a combination thereof. The base may be rigid or flexible. The base may cover the entire fastener support. The base may only cover a portion of the fastener support. The base and the support structure may be molded together.

The support structure may function to support the plurality of spacers, the plurality of dual hooks, the plurality of opposing dual hooks, or a combination thereof such that the plurality of spacers, the plurality of hooks, the plurality of opposing dual hooks, or a combination thereof remain in a vertical position. The support structure may contact the base of the side rail fasteners. The support structure and the base of the side rail fasteners may be a molded structure. The support structure may run the length of the side rail fasteners. The support structure may be parallel with the longest edge of the side rails. The side rail fasteners may include one or more, two or more, three or more, four or more, or five or more support structures in each the row of fasteners. The support structure and the dual hooks may be connected. The support structure and the dual hooks may be molded together. The support structure may run through the plurality of spacers, the plurality of dual hooks, the plurality of opposing hooks, or a combination thereof across the length of the row of fasteners.

The row of fasteners may function to create a strip of hook fasteners that connect with the strip of loop fasteners. The row of fasteners may include a support structure, a plurality of dual hooks, a plurality of opposing dual hooks, a plurality of spacers, or a combination thereof. The row of fasteners may include one or more, two or more, three or more, or four or more support structures. The row of fasteners may have one or more support structures across the length of the row of fasteners. The row of fasteners may be substantially perpendicular to the external flange, the internal flange, or both. The plurality of spacers, the external flange, the internal flange, or a combination thereof may prevent pre-engagement of the strip of loop fasteners such that a force may be applied to the flexible cover to engage the flexible cover and the side rails. The row of fasteners may include a plurality of spacers that may be elevated above the plurality of dual hooks, the plurality of opposing dual hooks or both such that the spacers prevent pre-engagement of the strip of loop fasteners. The spacers may substantially prevent pre-engagement by elevating the cover fasteners above the end fasteners (e.g., one or more ends of a hook may contact one or more loops but 10 percent or less or preferably 5 percent or less of the hooks (e.g., front hook, rear hook, or both) may be in contact with a loop). The row of fasteners may have a ratio of spacers to dual hooks of 1:1 or more, 1:2 or more, 1:3 or more, 1:4 or more, 1:5 or more, 1:6 or more, or 1:7 or more. The row of fasteners may have a ratio of dual hooks to opposing dual hooks of 1:1 or more, 1:2 or more, 1:3 or more, or 1:4 or more. Preferably, the ratio of dual hooks to opposing dual hooks is 1:1. The row of fasteners may form a pattern of dual hooks such that the dual hooks, opposing dual hooks, and spacers alternate.

The dual hooks may function to engage with the strip of loop fasteners. The dual hooks may have a vertical length of about 0.025 mm to about 2.54 mm. Preferably, the dual hooks may have a vertical length of about 0.300 mm to about 0.800 mm. The dual hooks may be supported in a vertical position by the one or more support structures. The dual hooks may include a top edge, a front hook, a rear hook, a connection edge, a trench, or a combination thereof. The front hook of the dual hooks and the front hook of the opposing dual hooks may face opposite directions. The dual hooks may alternate with the opposing dual hooks in the row of the fasteners. For example, a dual hook may precede an opposing dual hook, another hook may follow the opposing dual hook, and another opposing dual hook may follow the another dual hook so that the dual hooks and the opposing dual hooks form a pattern in the row of fasteners. The dual hooks may alternate with the spacers in the row of fasteners. The front hook, the rear hook, or both of the dual hooks may engage with the strip of loop fasteners. The front hook and the rear hook of each the dual hooks may face the same direction. For example, a hook may have a front hook and a rear hook and the front hook and the rear hook may extend in a same direction. The top surface of the dual hooks may be lowered below the upper surface of the spacers by distance. The distance may be 0.1 µm or more, 0.2 µm or more, 0.3 µm or more, 0.4 µm or more, or 0.5 µm or more. The distance may be 1.0 µm or more, 1.5 µm or more, 2.0 µm or more, 2.5 µm or more, or 3.0 µm or more. The distance may be 10 µm or more 15 µm or more, 20 µm or more, 25 µm or more, or 30 µm or more. The distance may be 100 µm or more, 150 µm or more, 200 µm or more, 250 µm or more, or 300 µm or more. The distance may be 100 µm or more, 150 µm or more, 200 µm or more, 250 µm or more, of 300 µm or more. The distance may be 1000 µm or less, 800 µm or less, 600 µm or less, or 400 µm or less. The top surface of the dual hooks may have a height that is below the external flange, the internal flange, or both. The height of the dual hooks may be less than the external flange, the internal flange, or both so that the flanges prevent pre-engagement of the cover fasteners to the bed fasteners located proximate to the flanges. The total width of the dual hooks may be measured from the connection lip of the front hook to the angled wall of the rear hook. The total width of the spacers may be measured from one side edge to the opposing side edge. The total width of the dual hooks may be the same as the total width of the spacers. The total width of the dual hooks may be less than the total width of the spacers. The total width of the dual hooks may be greater than the total width of the spacers such that the connection lip extends outside the side edge of the spacer. The total width of the dual hooks may be greater than the total width of the spacers such that the connection lip of the front hook may engage with the strip of loop fasteners outside of the side edge of the spacer. A tip of a dual hook may extend beyond the spacer in a first direction and a tip of a dual hook or opposing dual hook may not extend beyond the spacer in a second direction. Each dual hook or opposing dual hook may have one tip that extends beyond a spacer. Each dual hook or opposing dual hook may have two tips that are located within an area of the spacer (e.g., no tips extend beyond an edge of the spacer). The dual hooks may be parallel with the spacers, opposing dual hooks, or both. The dual hooks may be perpendicular with the external flange, the internal flange, or both.

The opposing dual hooks may function to engage with the strip of loop fasteners. The opposing dual hooks may have a vertical length of about 0.025 mm to about 2.54 mm. Preferably, the opposing dual hooks may have a vertical length of about 0.300 mm to about 0.800 mm. The opposing dual hooks may be supported in a vertical position by the one or more support structures. The opposing dual hooks include a top edge, a front hook, a rear hook, a connection edge, a trench, or a combination thereof. The opposing dual hooks may be a reverse mirror image of dual hooks. The front hook of the opposing dual hooks and the front hook of the dual hooks may face opposite directions. The front hook, the rear hook, or both of the opposing dual hooks may engage with the strip of loop fasteners. The front hook and the rear hook of the opposing dual hooks may face the same direction. The top surface of the opposing dual hooks may be lowered below the upper surface of the spacers by a distance. The distance may be 0.1 µm or more, 0.2 µm or more, 0.3 µm or more, 0.4 µm or more, or 0.5 µm or more. The distance may be 1.0 µm or more, 1.5 µm or more, 2.0 µm or more, 2.5 µm or more, or 3.0 µm or more. The distance may be 10 µm or more 15 µm or more, 20 µm or more, 25 µm or more, or 30 µm or more. The distance may be 100 µm or more, 150 µm or more, 200 µm or more, 250 µm or more, or 300 µm or more. The distance may be 100 µm or more, 150 µm or more, 200 µm or more, 250 µm or more, of 300 µm or more. The distance may be 1000 µm or less, 800 µm or less, 600 µm or less, or 400 µm or less. The top surface of the opposing dual hooks may be lowered below the external flange, the internal flange, or both. The total width of the opposing dual hooks may be measured from the connection lip of the front hook to the angled wall of the rear hook. The total width of the spacers may be measured from one side edge to the opposing side edge. The total width of the opposing dual hooks may be the same as the total width of the spacers. The total width of the opposing dual hooks may be less than the total width of the spacers. The total width of the opposing dual hooks may be greater than the total width of the spacers such that the connection lip extends outside the side edge of the spacer. The total width of the opposing dual hooks may be greater than the total width of the spacers such that the connection lip of the front hook may engage with the strip of loop fasteners outside of the side edge of the spacer. The opposing dual hooks may be parallel with the spacers, dual hooks, or both. The opposing dual hooks may be perpendicular with the external flange, the internal flange, or both.

The front hook may function to engage with the strip of loop fasteners. The front hook may include a connection lip, a top edge, and a rounded edge. Specifically, the front hook may engage with the strip of loop fasteners at the connection lip. The front hook may be the furthest lateral point of the dual hook, opposing dual hook, or both. The front hook may be the only point of engagement with the strip of loop fasteners. The connection lip of the front hook may extend laterally outside of the side edge of the spacer by a horizontal distance. The front hook may be rounded, crescent, bracketed, ribbed, square, or a combination thereof. The rounded edge of the front hook may be proximate to the rear hook.

The rear hook may function to engage with the strip of loop fasteners. The rear hook may include a connection lip, a top edge, and an angled wall. Specifically, the rear hook may engage with the strip of loop fasteners at the connection lip. The connection lip of the rear hook may be proximate to the front hook. The rear hook may be a point of engagement with the strip of loop fasteners. The rear hook may be rounded, crescent, bracketed, ribbed, square, or a combination thereof. The rear hook may hang over the trench.

The trench may function to support the front hook, rear hook, or both. The trench may support the front hook, rear hook, or both in a vertical position. The trench may function to create a space for the strip of loop fasteners to engage with the rear hook of the dual hook, opposing dual hook, or both. The trench may contact the support structure. The trench may be a vertical distance below the top edge of the dual hooks, the upper surface of the spacers, or both. The trench may be located between the connection lip of the rear hook and the rounded edge of the front hook.

The connection lip or tip may function to connect the strip of fasteners and the front hook, the rear hook, or both. The connection lip may substantially curve into a point. The connection lip may slope down into the connection edge of the dual hook, opposing dual hook, or both. The connection lip and the strip of loop fasteners may connect such that the flexible cover is secure and engaged on the side rails and encased over the vehicle bed. The connection lip may be sufficiently below the upper surface of the spacer such that a force is needed to engage the connection lip and the loop fastener. The connection lip and loop fastener may engage when a force is applied to the flexible cover such that the loop fasteners are pushed down past the elevated upper surface of the plurality of spacers and the top edge of the dual hooks. The connection lip may curve into a point, a rounded edge, a hooked edge, a crescent edge, or a combination thereof. The connection lip may slant downward (e.g., be angled down towards the bed of the vehicle) toward the base or may slant upward and away from the base of the side rail fasteners. The connection lip may be vertically opposing the top edge of the dual hook, opposing dual hook, or both.

The top edge of the front hook, rear hook, or both may function to define the highest point of the dual hook, the opposing dual hook, or both. The top edge may be rounded. The top edge may be a distinct point. The top edge may contact the connection lip, the rounded edge, the angled wall, or a combination thereof. The top edge may be elevated above the support structure. The top edge may be lowered below the upper surface of the spacers by a distance as described herein. The top edge may be lowered below the internal flange, the external flange, or both by a vertical distance relative to the base of side rail fasteners. The top edge may be the same height as the plurality of spacers, external flange, internal flange, or a combination thereof. The top edge of the rear hook may slant downward towards the angled wall.

The angled wall may define the back portion of the rear hook. The angled wall may contact the top edge of the rear hook. The angled wall may contact the connection edge. The angled wall may be proximate to the side edge of the spacer. The angled wall may have an angled position relative to the base of the side rail fasteners. The angled position of the angled wall may be 90 degrees or less, 87 degrees or less, or 85 degrees or less. The angled position may be, 83 degrees or more, 80 degrees or more, or 75 degrees or more. The angled wall may be substantially planar. The angle wall may be substantially curved. The angled wall and the top edge of the rear hook may form a point when in contact. The angled wall and the top edge of the rear hook may be rounded when in contact. The angled wall may be substantially similar to the rounded edge of the front hook.

The rounded edge may function to define the portion between the trench and the top edge of the front hook. The rounded edge may be curved, pointed, crescent, jagged, or a combination thereof. The rounded edge may be lowered below the top edge of the front hook, rear hook, or both. The rounded edge may be laterally opposite to the connection edge of the rear hook relative to the trench.

The connection edge may function to connect the base of the side rail fasteners and the dual hooks. The connection edge may be the only portion of the dual hooks that contacts the base. The connection edge may function to define the mold between the dual hooks and the base of the side rail fasteners. The connection edge of the dual hooks may be level with the bottom edge of the spacers, the support structure, or both.

The spacer may function to prevent pre-engagement of the dual hooks and the strip of loop fasteners. The spacers may have a vertical length of about 0.05 mm to about 3.00 mm. Preferably, the dual hooks may have a vertical length of about 0.350 mm to about 0.850 mm. The spacers may extend above the dual hooks, the opposing dual hooks, or both so that strops of loop fasteners are prevented from connecting to the dual hooks, the opposing dual hooks, or both when a cover is moved over the bed. The spacer may have a height that is greater than a height of the dual hooks, the opposing dual hooks, or both by a distance of about 0.001 mm or more, about 0.01 mm or more, about 0.05 mm or more, about 0.1 mm or more, about 0.5 mm or more, about 1 mm or more, about 2 mm or more, about 5 mm or more about 7.5 mm or more, about 2 cm or less, or about 1 cm or less. For example, an upper surface of the spacer may extend about a highest point, a tip, or both of the dual hooks or opposing dual hooks by a distance so that loops are prevented from forming a connection with the dual hooks or opposing dual hooks. The spacers may include an upper surface, side edge, and bottom edge. The spacers may be triangular, square, pentagonal, hexagonal, heptagonal, octagonal, or a combination thereof. The edges of the spacers may be rounded, pointed, squared, jagged, or a combination thereof. The curved edge of the spacer may be where the side edge and the upper surface contact. The curved edge of the spacers may be rounded or pointed. The upper surface of the spacers may be elevated above the top edge of the dual hooks, the opposing dual hooks, or both by a distance as described above. In the row of fasteners, the spacers may alternate with the dual hooks, opposing dual hooks, or both. The ratio of spacers to dual hooks may be 1:1 or more, 1:2 or more, 1:3 or more, 1:4 or more, or 1:5 or more. The ratio of spacers to opposing dual hooks may be 1:1 or more, 1:2 or more, 1:3 or more, 1:4 or more, or 1:5 or more. The upper surface of the spacers, and the external flange and internal flange may be the same height relative to the fastener support. The upper surface of the spacer may be lowered below the external flange and internal flange by a vertical distance as described herein. The upper surface of the spacers may be substantially the same height as the external flange, the internal flange, or both. The spacers may be substantially the same width as the dual hooks, opposing dual hooks, or both. The curved edge and upper surface of the spacer may substantially prevent pre-engagement of the loop fasteners and dual hooks such that the spacer is a physical buffer between the loop fasteners and dual hooks.

The curved edge may function to define the point of contact between the side edge of the spacer and the upper surface of the spacer. The curved edge may be rounded, pointed, jagged, or a combination thereof.

The upper surface may define the highest point of the spacer. The upper surface may be rounded. The upper surface may be pointed. The upper surface may be a plurality of points that are the same height. The upper surface may be substantially level, relative to the fastener support, with the external flange, the internal flange, or both. The upper surface of the spacer may be elevated above the spacers by a distance as described above.

The side edge may function to define the lateral edges of the spacers. The side edge may be substantially straight. The side edge may be rounded. The side edge may be angled relative to the base of the side rail fasteners. The angle of the side edge may be 90 degrees or less; 88 degrees or less; 86 degrees or less. The angle of the side edge may be 80 degrees or more, 82 degrees or more, or 84 degrees of more. Preferably, the angle of the side edge is a right angle (i.e., about 90 degrees). The distance from one side edge to an opposing side edge may define a total width of the spacer. For the dual hooks, opposing dual hooks, or both, the distance from the connection lip of the front hook to the angled wall of the rear hook may define a total width of the dual hooks. The total width of the spacers and the total width of the dual hooks may be substantially the same. The total width of the spacer may be less than the total width of the dual hooks such that the front hook of the dual hook protrudes past the side edge of the spacers. The total width of the spacer may be more than the total width of the dual hooks such that the spacers prevent pre-engagement of the dual hooks and the strip of loop fasteners.

The bottom edge may function to connect the spacer to the base of the side rail fasteners. The bottom edge may be level with the lowest point of the support structure. The bottom edge may be level with the connection edge of the dual hooks, opposing dual hooks, or both. The bottom edge may define a mold between the spacer and the base. The bottom edge may be an adhesive between the spacer and the base.

FIG. 1 is a perspective view of a vehicle cover assembly 100. The vehicle cover assembly 100 includes a vehicle bed 104, flexible cover 106, and side rails 108. The vehicle bed 104 includes a vehicle floor 103, two vertical walls 105 that oppose each other, a cab wall 107, and a tailgate 109 that in combination from a box with an open top. The vehicle floor 103 is contacting the cab wall 107, the two opposing vertical walls 105, and the tailgate 109. The cab wall 107, the two opposing vertical walls 105, and the tailgate 109 extend vertically above the vehicle floor 103. The cab wall 107 is closest to the vehicle cab 101. The tailgate 109 is the farthest wall from the vehicle cab 101. The flexible cover 106 includes a cover fastener 12 with a strip of loop fasteners 102. The side rail fasteners 14 releasably connect with the strip of loop fasteners 102 when the flexible cover 106 is covering the vehicle bed 104. The side rails 108 include side rail fasteners 14. The vertical wall 105 of the vehicle bed 104 and the side rails 108 are connected.

Figure 2A:
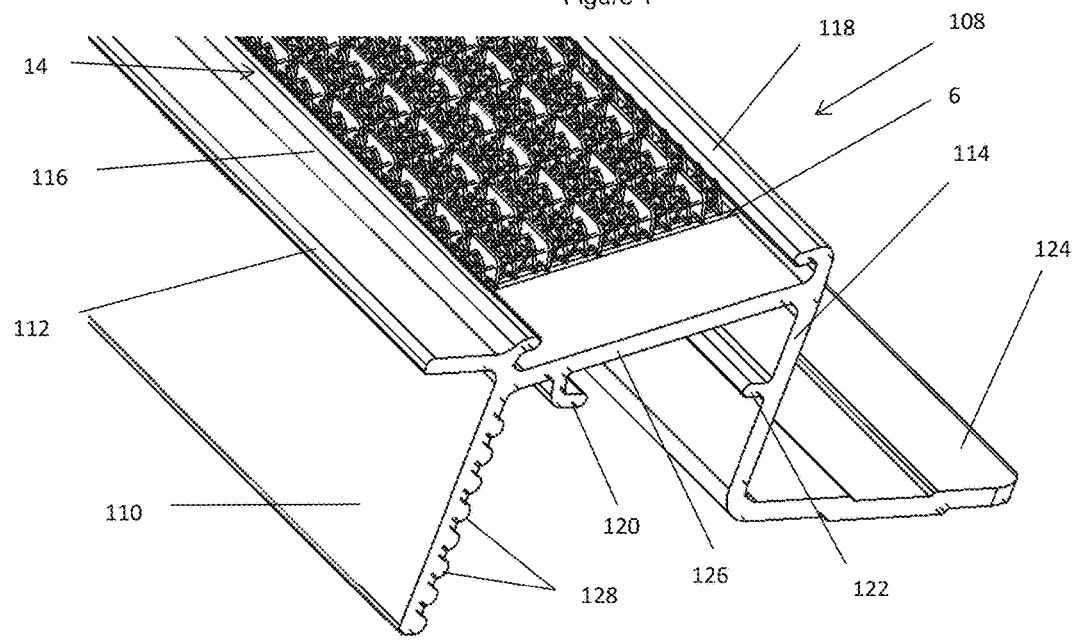
FIG. 2A is a perspective view of a side rail.

FIG. 2A is a perspective view of a side rail 108. The side rail 108 includes a clamp plate 110, a fastener support 126, a side rail fastener 14, a connection portion 114, and a longitudinal portion 124. The clamp plate 110 and fastener support 126 connect at the external side of the side rail 108. The clamp plate 110 includes an extension plate 112. The connection portion 114 includes a ridge 122 that extends toward the clamp plate 110 of the side rail 108. The connection portion 114 and the fastener support 126 connect at the internal side of the side rail 108. The connection portion 114 and the longitudinal portion 124 connect and are perpendicular to each other. The fastener support 126 includes an external flange 116, an internal flange 118, and a hook 120. The internal flange 118 and the external flange 116 both partially cover the side rail fastener 14. The side rail fastener 14 is positioned between the external flange 116 and the internal flange 118, and the side rail fastener 14 substantially covers the fastener support 128 between the external flange 116 and the internal flange 118. side rail fastener 14 contacts the fastener support 126 at the base 6 of the side rail fastener 14.

Figure 2B:
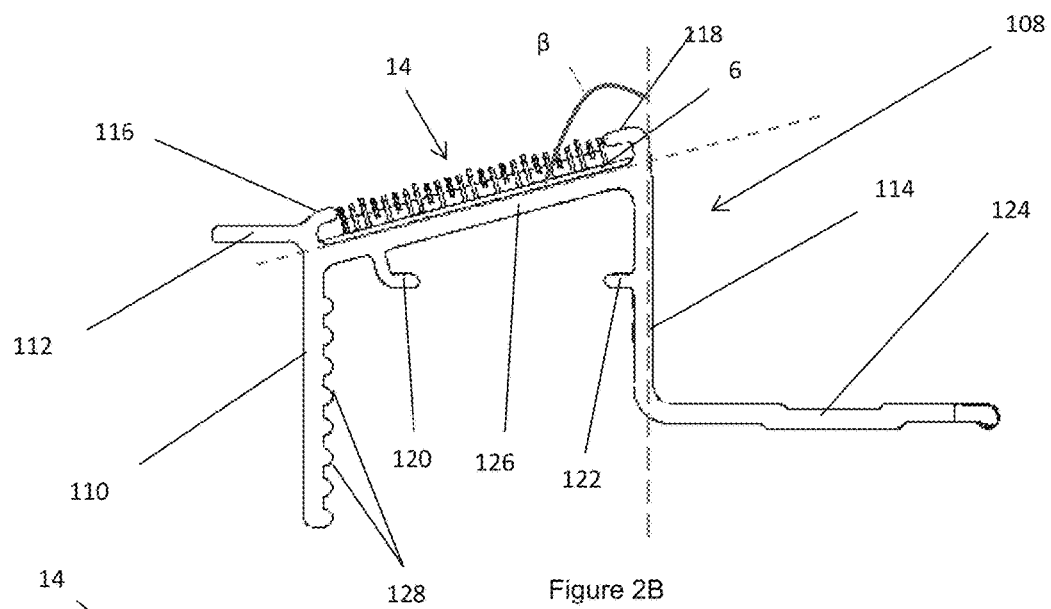
FIG. 2B is an end view of a side rail.

FIG. 2B is a side view of a side rail 108. The side rail 108 includes a clamp plate 110, a fastener support 126, a side rail fastener 14, a connection portion 114, and a longitudinal portion 124. The base 6 and side rail fasteners 14 extend at an angle (β) relative to a horizontal plane. The clamp plate 110 includes a plurality of ribs 128. The clamp plate 110 and fastener support 126 connect at the external side of the side rail 108. The clamp plate 110 includes an extension plate 112 that extends towards lateral edge of the of the vehicle bed (not shown). The connection portion 114 includes a ridge 122 that extends toward the external side of the side rail 108. The connection portion 114 and the fastener support 126 connect at the internal side of the side rail 108. The connection portion 114 and the longitudinal portion 124 connect and are perpendicular to each other. The fastener support 126 includes an external flange 116, an internal flange 118, and a hook 120. The internal flange 118 is elevated above the external flange 116 and the extension plate 112. The side rail fastener 14 contacts the fastener support 126 at the base 6 of the side rail fastener 14. The side rail fastener 14 is positioned between the external flange 116 and the internal flange 118.

Figure 3A:
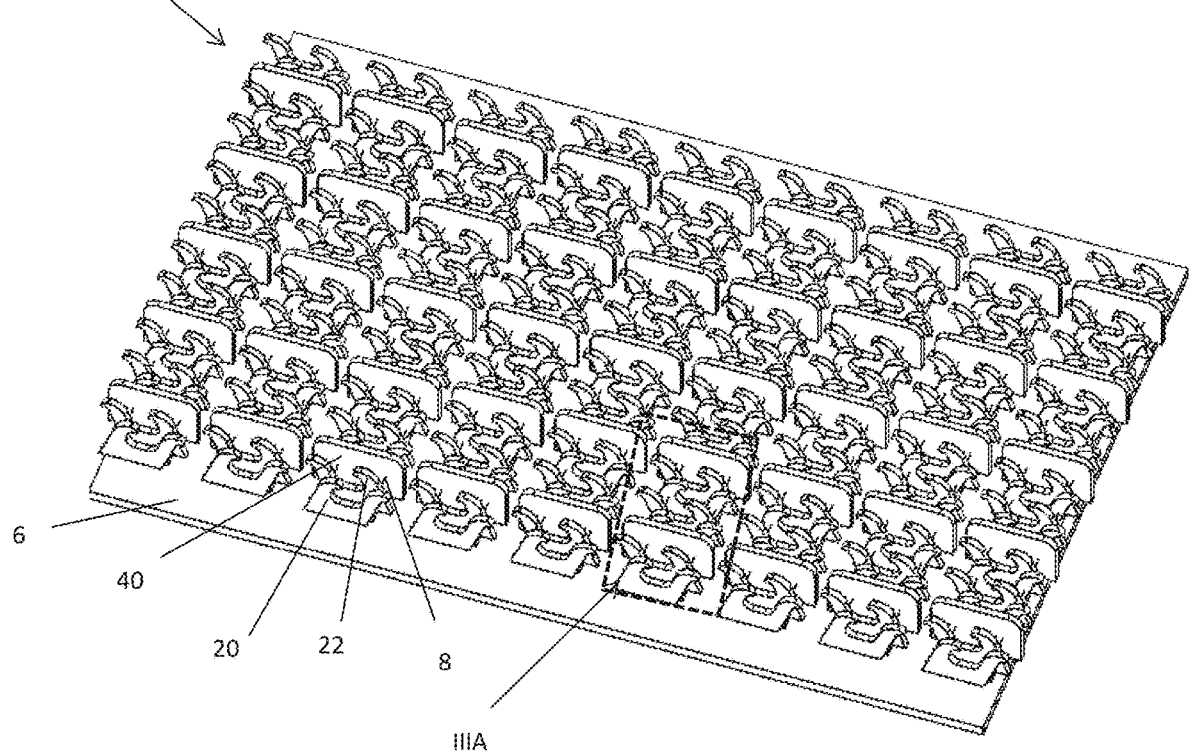
FIG. 3A is a perspective view of a side rail fastener.

FIG. 3A is a perspective view of a side rail fastener 14. The side rail fastener 14 includes a base 6. The base 6 contacts with a plurality of dual hooks 20, a plurality of opposing dual hooks 22, and a plurality of spacers 40. The support structure 8 connects the plurality of dual hooks 20, the plurality of opposing dual hooks 22, and the plurality of spacers 40.

Figure 3B:
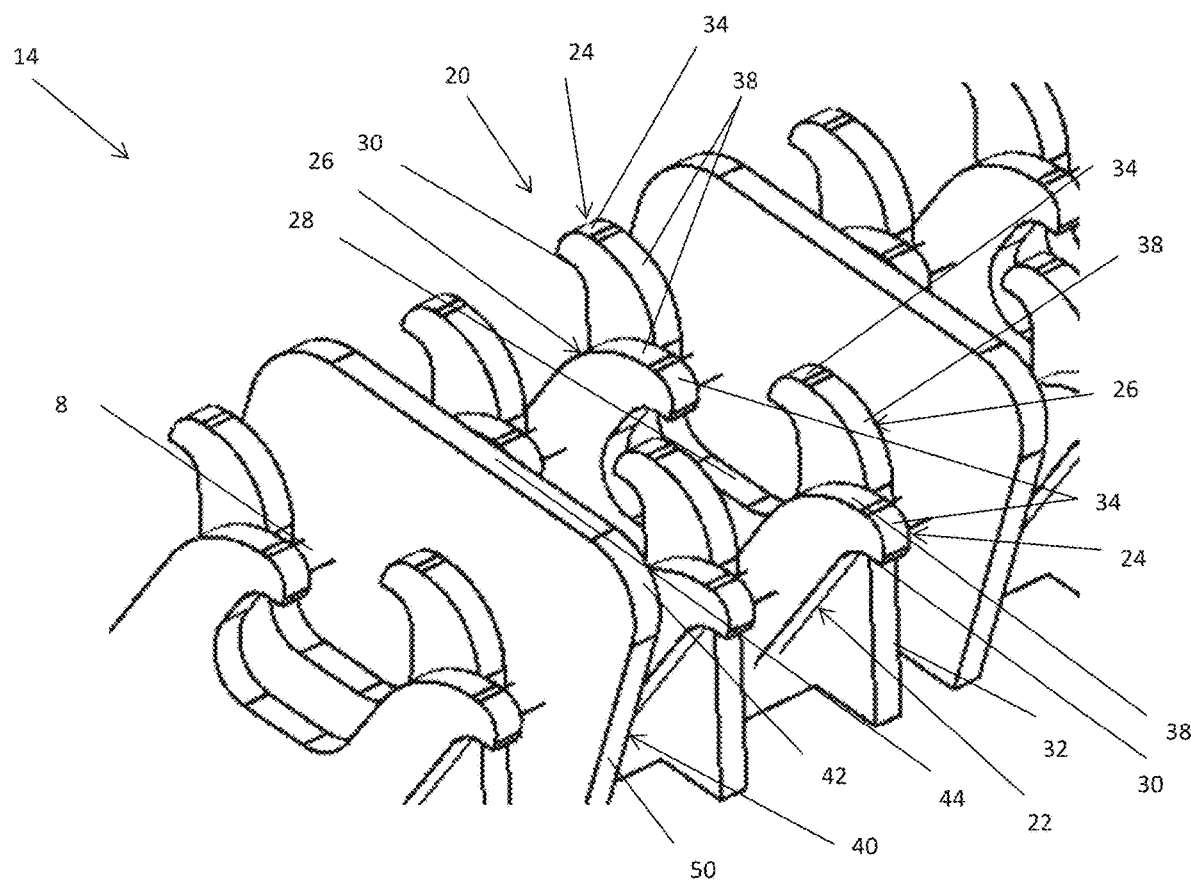
FIG. 3B is a close-up perspective view of a side rail fastener in box IIIA.

FIG. 3B is a close-up view of the side rail fastener 14 in box IIIA. The side rail fastener 14 includes a plurality of dual hooks 20, a plurality of opposing dual hooks 22, and a plurality of spacers 40. The plurality of dual hooks 20, the plurality of opposing dual hooks 22, and the plurality of spacers 40 are connected by a support structure 8. The plurality of dual hooks 20, the plurality of opposing dual hooks 22, and the plurality of spacers 40 alternate with each other to form a pattern. Each of the dual hooks 20 and each of the opposing dual hooks 22 include a trench 28 extending below and located between a front hook 24 and a rear hook 26. The front hook 24 includes the connection lip 30, a top edge 34, and a rounded edge 38. The rear hook 26 includes a top edge 34, a connection lip 30, an angled wall 32, and a rounded edge 38. Each of the spacers 40 includes an upper surface 44, a side edge 50, and a curved edge 42.

Figure 4A:
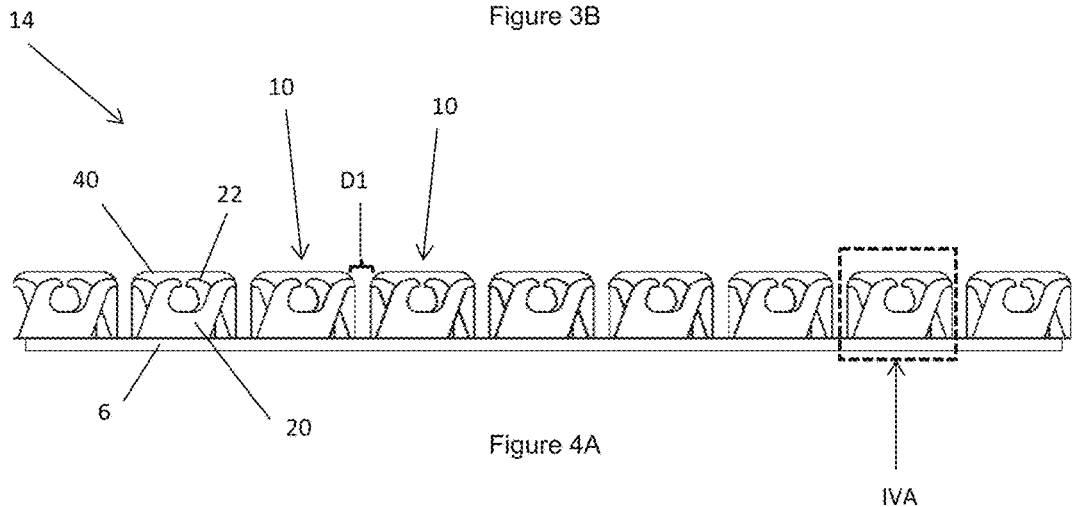
FIG. 4A is a side view of a side rail fastener.

FIG. 4A is a side view of a side rail fastener 14. The side rail fastener 14 includes a plurality of dual hooks 20, plurality of opposite dual hooks 22, and a plurality of spacers 40 that are on a base 6. The plurality of dual hooks 20, plurality of opposite dual hooks 22, and a plurality of spacers 40 are shown in rows of fasteners 10 and each row of fasteners 10 is separated by distance D1. Each row of fasteners 10 is composed of a plurality of spacers 40, a plurality of dual hooks 20, and a plurality of opposing dual hooks 22.

Figure 4B:
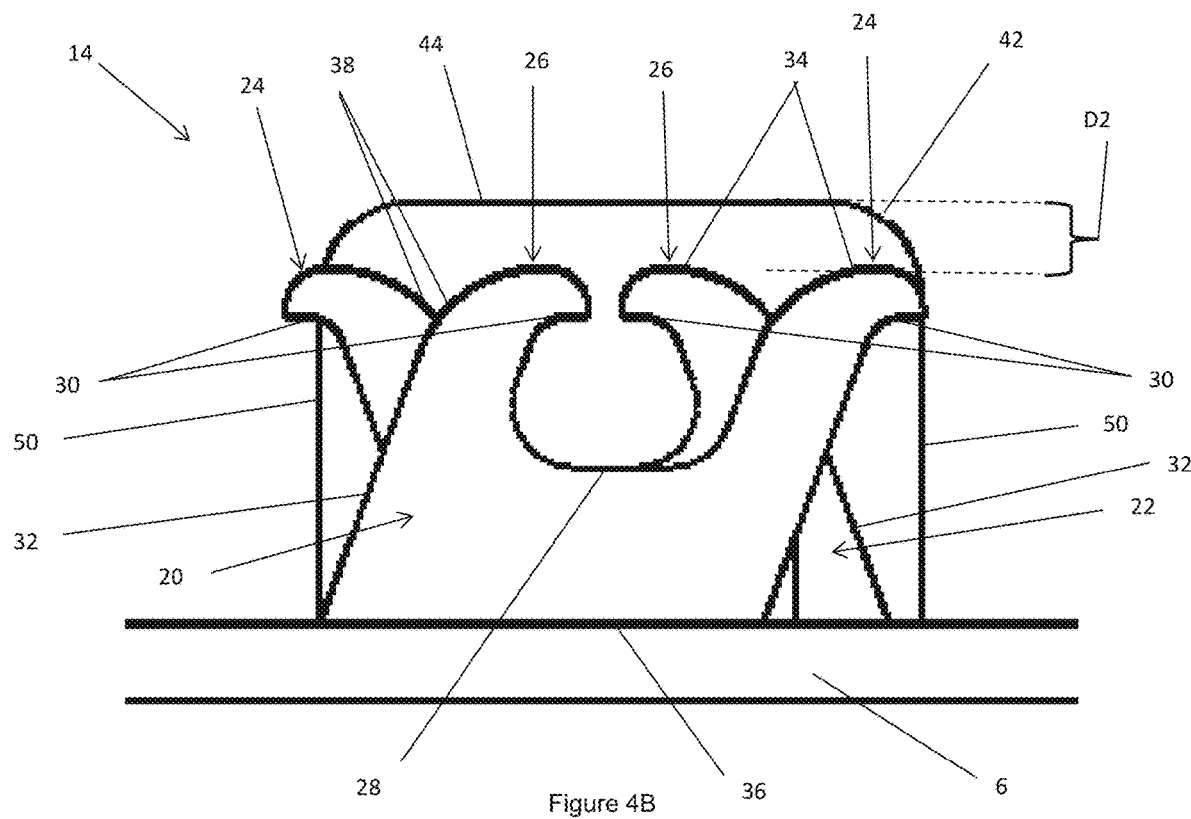
FIG. 4B is a close-up side view of side rail fastener in box IVA.

FIG. 4B is a close-up side view of a side rail fastener 14 in box IVA. The side rail fastener 14 includes a plurality of dual hooks 20, a plurality of opposing dual hooks 22, and a plurality of spacers 40. Each of the dual hooks 20 and each of the opposing hooks 22 include a trench 28, connection edge 36, a front hook 24 and a rear hook 26. The front hook 24 includes the connection lip 30, a top edge 34, and a rounded edge 38. The rear hook 26 includes a top edge 34, a connection lip 30, an angled wall 32, and a rounded edge 38. The plurality of dual hooks 20 contact the base 6 at the connection edge 36. The plurality of spacers 40 includes a curved edge 42, a upper surface 44, and a side edge 50. The upper surface 44 of the plurality of spacers 40 is elevated above the top edge 34 of the plurality of dual hooks 20 and plurality of opposing dual hooks 22 by distance D2.

Figure 4C:
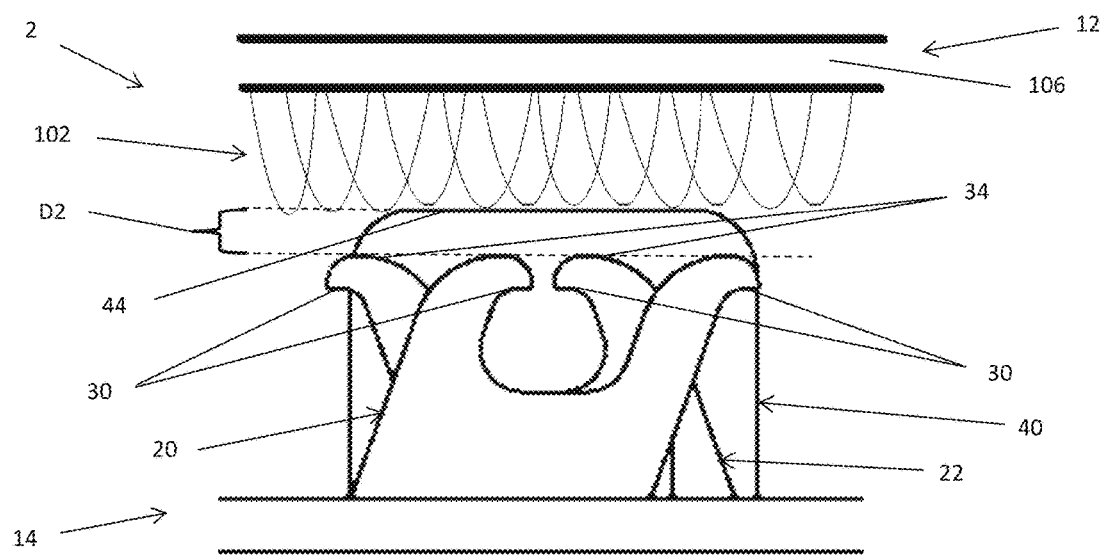
FIG. 4C is a side view of a fastener assembly before engagement of the strip of loop fasteners.

FIG. 4C is a side view of a fastener assembly 2 before engagement with the strip of loop fasteners 102. The fastener assembly 2 includes a cover assembly 12 and a side rail assembly 14. The cover assembly 12 includes the flexible cover 106 and a strip of loop fasteners 102. The side rail assembly 14 includes dual hooks 20, opposing dual hooks 22, and spacers 40. The upper surface 44 of the spacers 40 prevent pre-engagement of the top surfaces 34 of the dual hooks 20 and opposing dual hooks 22 by a distance D2. The elevated upper surface 44 of the spacers substantially prevents pre-engagement of the strip of loop fasteners 102 and the connection lip of the dual hooks 20 and opposing dual hooks 22 so that a force is required to engage the fastener assembly.

Figure 5:
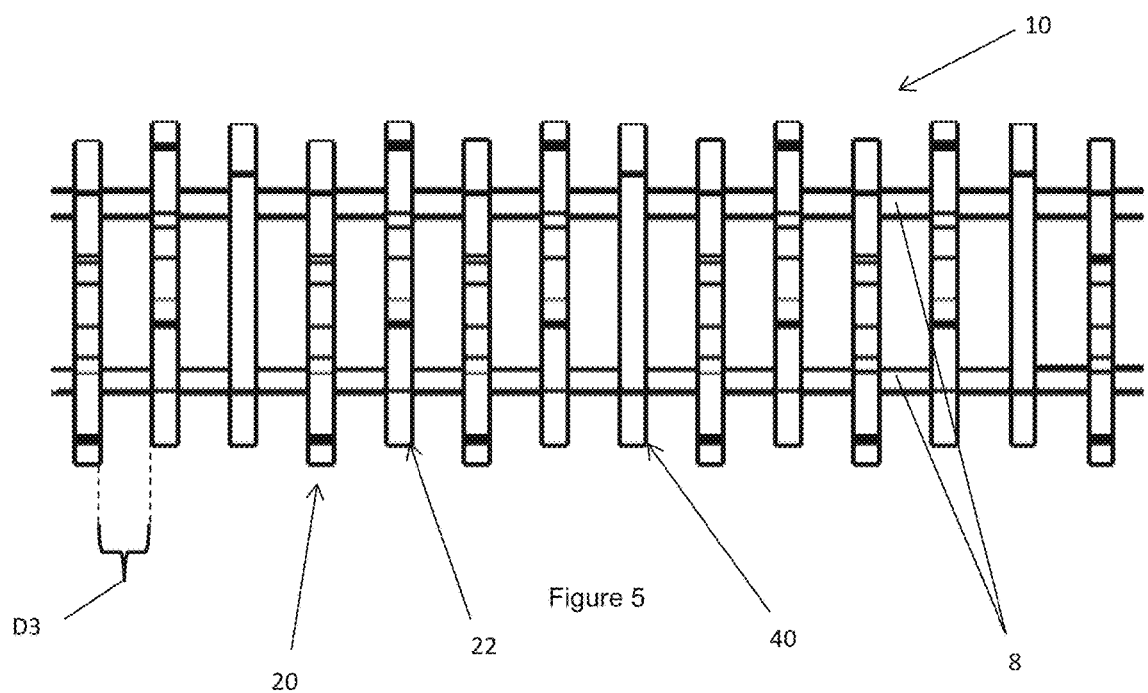
FIG. 5 is a top view of a row of fasteners.

FIG. 5 is a top view of a row of fasteners 10. The row of fasteners 10 includes support structures 8, a plurality of dual hooks 20, a plurality of opposing dual hooks 22, and a plurality of spacers 40. The support structures 8 runs the length of the row of fasteners 10 and connect with the plurality of dual hooks 20, the plurality of opposing dual hooks 22, and the plurality of spacers 40. The plurality of dual hooks 20, the plurality of opposing dual hooks 22, and the plurality of spacers 40 are parallel relative to each other. The plurality of dual hooks 20, the plurality of opposing dual hooks 22, and the plurality of spacers 40 are separated by distance D3. The support structure 8 is substantially perpendicular to the plurality of dual hooks 20, the plurality of opposing dual hooks 22, and the plurality of spacers 40.

Figure 6:
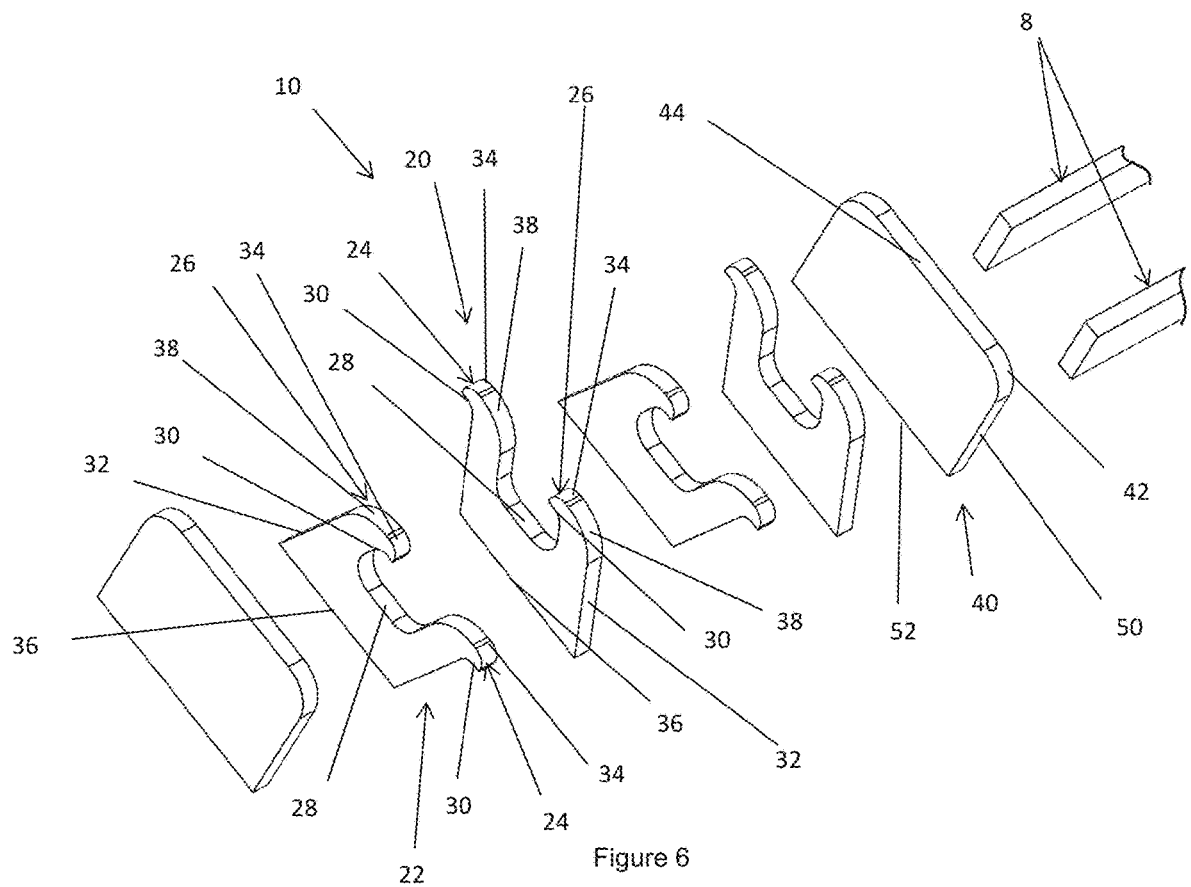
FIG. 6 is an exploded view of a row of fasteners.

FIG. 6 is an exploded view of a row of fasteners 10. The row of fasteners 10 includes support structures 8, base (not shown), a spacer 40, a dual hook 20 and an opposing dual hook 22. The dual hook 20 and the opposing dual hook 22 both include lip connections 30, a trench 28, top edges 34, a rear hook 26, a front hook 24, a rounded edge 38, a connection edge 36, and an angled wall 32. The spacer 40 includes a upper surface 44, a curved edge 42, bottom edge 52, and a side edge 50.

Figure 7:
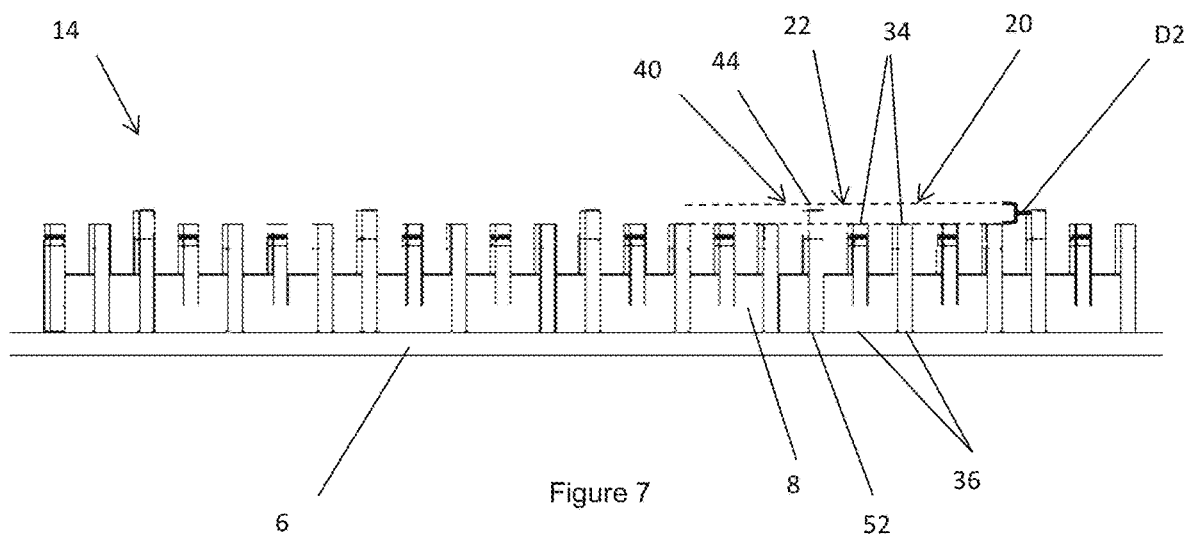
FIG. 7 is an end view of a side rail fastener.

FIG. 7 is an end view of a side rail assembly 14. The side rail assembly 14 includes a plurality of spacers 40, a plurality of dual hooks 20, and a plurality of opposing dual hooks 22 that are connected at the support structure 8. The side rail assembly 14 includes a base 6. Each of the plurality of dual hooks 20 and the plurality of opposing dual hooks 22 include a top edge 34 and connection edge 36. The base 6 and the plurality of dual hooks 20 and the plurality of opposing dual hooks 22 contact at the connection edge 36. Each of the plurality of spacers 40 includes an upper surface 44 and bottom edge 52. The plurality of spacers 40 and the base 6 contact at the bottom edge 52. The upper surface 44 of the plurality of spacers 40 is elevated above the top edge 34 of the plurality of dual hook 20 and the plurality of opposing dual hooks 22 by distance D2.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Fastener Assembly
6 Base
8 Support Structure
10 Row of Fasteners
12 Cover Fasteners
14 Side Rail Fasteners
20 Dual Hook
22 Opposing Dual Hook
24 Front Hook
26 Rear Hook
28 Trench
30 Connection Lip
32 Angled Wall
34 Top Edge
36 Connection Edge
38 Rounded Edge
40 Spacer
42 Curved Edge
44 Upper Surface
50 Side Edge
52 Bottom Edge
100 Vehicle Cover Assembly
101 Vehicle Cab
102 Strip of Loop Fasteners
103 Vehicle Floor
104 Vehicle Bed
105 Vertical Wall
106 Flexible Cover
107 Cab Wall
108 Side Rail
109 Tailgate
110 Clamp Plate
112 Extension Plate
114 Connecting Portion
116 External Flange
118 Internal Flange
120 Hook
122 Ridge
124 Longitudinal Portion
126 Fastener Support
128 Ribs

The invention claimed is:

1. A vehicle cover assembly comprising;
(a) a flexible cover;
(b) one or more side rails; and
(c) a fastener assembly that is secured to a vehicle bed comprising;
  (i) a cover fastener that is on one or more edge regions of the flexible cover; and
  (ii) a side rail fastener with one or more rows of fasteners comprising;
    (1) a plurality of dual hooks on a base that releasably connect with the cover fastener of the flexible cover, the plurality of dual hooks including a front hook and a rear hook, wherein the front hook and the rear hook each include a connection lip; and
    (2) a plurality of spacers between the plurality of dual hooks, each of the plurality of spacers having side edges that are lateral bounds of each of the spacers, wherein the connection lip of the front hook and the rear hook laterally extends outside of the side edges.

2. The vehicle cover assembly of claim 1, wherein the plurality of dual hooks includes a top edge, and the plurality of spacers includes an upper surface.

3. The vehicle cover assembly of claim 2, wherein the upper surface of the plurality of spacers is elevated above the top edge of the plurality of dual hooks by a distance so that a force is required to engage the fastener assembly.

4. The vehicle cover assembly of claim 1, wherein the fastener assembly includes a ratio of the plurality of spacers to the plurality of dual hooks of about 1:2 or more.

5. The vehicle cover assembly of claim 1, wherein the cover fastener includes a base and one or more strips of loop fasteners.

6. The vehicle cover assembly of claim 1, wherein the fastener assembly includes four or more dual hooks for every spacer.

7. The vehicle cover assembly of claim 1, wherein the fastener assembly further comprises a support structure that connects and supports the plurality of dual hooks and the plurality of spacers.

8. The vehicle cover assembly of claim 7, wherein the support structure is below a top edge of the plurality of dual hooks.

9. The vehicle cover assembly of claim 1, wherein each of the plurality of dual hooks includes a front hook and a rear hook.

10. The vehicle cover assembly of claim 1, wherein the plurality of spacers and the plurality of dual hooks are parallel.

11. The vehicle cover assembly of claim 1, wherein the fastener assembly further comprises a plurality of opposing dual hooks.

12. The vehicle cover assembly of claim 11, wherein the plurality of opposing dual hooks, the plurality of spacers and the plurality of dual hooks alternate.

13. The vehicle cover assembly of claim 11, wherein the ratio of the plurality of dual hooks to the plurality of opposing dual hooks is 1:1 or more.

14. The vehicle cover assembly of claim 11, wherein the plurality of opposing dual hooks includes a front hook and a rear hook.

15. The vehicle cover assembly of claim 7, wherein the plurality of spacers, the plurality of dual hooks, and the support structure are molded together.

16. A vehicle cover assembly comprising;
(a) a flexible cover;
(b) one or more side rails; and
(c) a fastener assembly that is secured to a vehicle bed comprising:
  (i) a cover fastener that is on one or more edge regions of the flexible cover; and
  (ii) a side rail fastener with one or more rows of fasteners comprising;
    (1) a plurality of dual hooks each including a top edge, the plurality of dual hooks being located on a base that releasably connects with the cover fastener of the flexible cover, wherein the plurality of dual hooks includes a front hook and a rear hook and the front hook and the rear hook each include a connection lip; and
    (2) a plurality of spacers having an upper surface and side edges that are lateral bounds of each of the spacers, the plurality of spacers being located between the plurality of dual hooks along a length of the fastener assembly, wherein the connection lip of the front hook and the rear hook laterally extends outside of the side edges;
  wherein the upper surface of the plurality of spacers is elevated above the top edge of the plurality of dual hooks so that, when the flexible cover extends over the fastener assembly, the flexible cover contacts the upper surface of the plurality of spacers and substantially prevents pre-engagement of the plurality of dual hooks and the cover fastener.

17. The vehicle cover assembly of claim 16, wherein the plurality of dual hooks contact the flexible cover when a force is applied to the cover.

18. The vehicle cover assembly of claim 1, wherein the plurality of spacers contact the flexible cover to prevent pre-engagement of the plurality of dual hooks and the cover fastener until a force is applied to the flexible cover.

19. The vehicle cover assembly of claim 16, wherein the connection lip of the front hook and the rear hook engages one or more loops of a strip of loop fasteners.

* * * * *